US006434533B1

United States Patent
Fitzgerald

(10) Patent No.: US 6,434,533 B1
(45) Date of Patent: Aug. 13, 2002

(54) METHOD FOR THE EXCHANGE, ANALYSIS, AND REPORTING OF PERFORMANCE DATA IN BUSINESSES WITH TIME-DEPENDENT INVENTORY

(75) Inventor: Stephen R. Fitzgerald, Austin, TX (US)

(73) Assignee: Market Data Systems, Inc., Conshohocken, PA (US)

( * ) Notice: Subject to any disclaimer, the term of this patent is extended or adjusted under 35 U.S.C. 154(b) by 0 days.

(21) Appl. No.: 09/428,163

(22) Filed: Oct. 27, 1999

(51) Int. Cl.[7] .............................................. G06F 17/60
(52) U.S. Cl. .................. 705/10; 705/1; 705/7
(58) Field of Search ........................... 705/1, 7, 10, 11, 705/30

(56) References Cited

U.S. PATENT DOCUMENTS

| | | | |
|---|---|---|---|
| 4,788,643 A | 11/1988 | Trippe et al. | 364/407 |
| 5,191,523 A | 3/1993 | Whitesage | 364/407 |
| 5,253,165 A | 10/1993 | Leiseca et al. | 364/407 |
| 5,255,184 A | 10/1993 | Hornick et al. | 364/407 |
| 5,270,921 A | 12/1993 | Hornick | 364/407 |
| 5,404,291 A | 4/1995 | Kerr et al. | 364/407 |

(List continued on next page.)

FOREIGN PATENT DOCUMENTS

EP    0994602 A2  *  4/2000

OTHER PUBLICATIONS

"Computer System for Efficient Laboratory Management"; Innovation, Nov. 1990, n 180.*

Primary Examiner—Edward R. Cosimano

(74) Attorney, Agent, or Firm—Caesar, Rivise, Bernstein, Cohen & Pokotilow, Ltd.

(57) ABSTRACT

A method is taught for processing performance data in a data reporting system having a plurality of business entities and a report center in communication with the plurality of business entities.

The method includes transmitting by the plurality of business entities to the report center customer performance data indicative of the operation of the business entities during a first day and processing of the customer performance data by the report center to provide processed performance data. Availability of the processed performance data is provided to a selected business entity during a second day wherein the time difference between the first day and the second day is less than eleven days.

The processed performance data includes processed occupancy data, processed average daily rate data and processed RevPAR data. The method further includes determining price information in accordance with the processed performance data, pricing a product by the selected business entity in accordance with the determined price information, and selling the product according to the pricing.

The processed performance data can be requested by the selected business entity prior to providing availability of the processed performance data. Data can be transmitted by way of a network data connection and an internet connection.

26 Claims, 17 Drawing Sheets

U.S. PATENT DOCUMENTS

| | | | |
|---|---|---|---|
| 5,463,546 A | 10/1995 | Parkhurst | 364/407 |
| 5,581,461 A | 12/1996 | Coll et al. | 705/5 |
| 5,644,721 A | 7/1997 | Chung et al. | 705/6 |
| 5,652,867 A | 7/1997 | Barlow et al. | 395/500 |
| 5,675,746 A | 10/1997 | Marshall | 705/35 |
| 5,712,985 A | 1/1998 | Lee et al. | 705/7 |
| 5,724,520 A | 3/1998 | Goheen | 705/5 |
| 5,732,398 A | 3/1998 | Tagawa | 705/5 |
| 5,732,401 A | 3/1998 | Conway | 705/29 |
| 5,745,878 A | 4/1998 | Hashimoto et al. | 705/1 |
| 5,764,981 A | 6/1998 | Brice et al. | 395/671 |
| 5,793,632 A | 8/1998 | Fad et al. | 364/464.1 |
| 5,797,127 A | 8/1998 | Walker et al. | 705/5 |
| 5,822,736 A | 10/1998 | Hartman et al. | 705/1 |
| 5,826,252 A | 10/1998 | Wolters, Jr. et al. | 707/1 |
| 5,832,452 A | 11/1998 | Schneider et al. | 705/5 |
| 5,832,453 A | 11/1998 | O'Brien | 705/6 |
| 5,835,716 A | 11/1998 | Hunt et al. | 395/200.43 |
| 5,864,818 A | 1/1999 | Feldman | 705/5 |
| 5,897,620 A | 4/1999 | Walker et al. | 705/5 |
| 5,924,072 A | 7/1999 | Havens | 705/1 |
| 5,926,793 A | 7/1999 | de Rafael et al. | 705/5 |
| 5,926,798 A | 7/1999 | Carter | 705/26 |
| 5,948,040 A | 9/1999 | De Lorne et al. | 701/201 |
| 5,950,171 A | 9/1999 | Madell | 705/7 |
| 5,960,407 A | 9/1999 | Vivona | 705/10 |
| 6,088,688 A * | 7/2000 | Crooks et al. | 705/412 |
| 6,102,162 A * | 8/2000 | Teicher | 186/39 |
| 6,148,335 A * | 11/2000 | Haggard et al. | 709/224 |

* cited by examiner

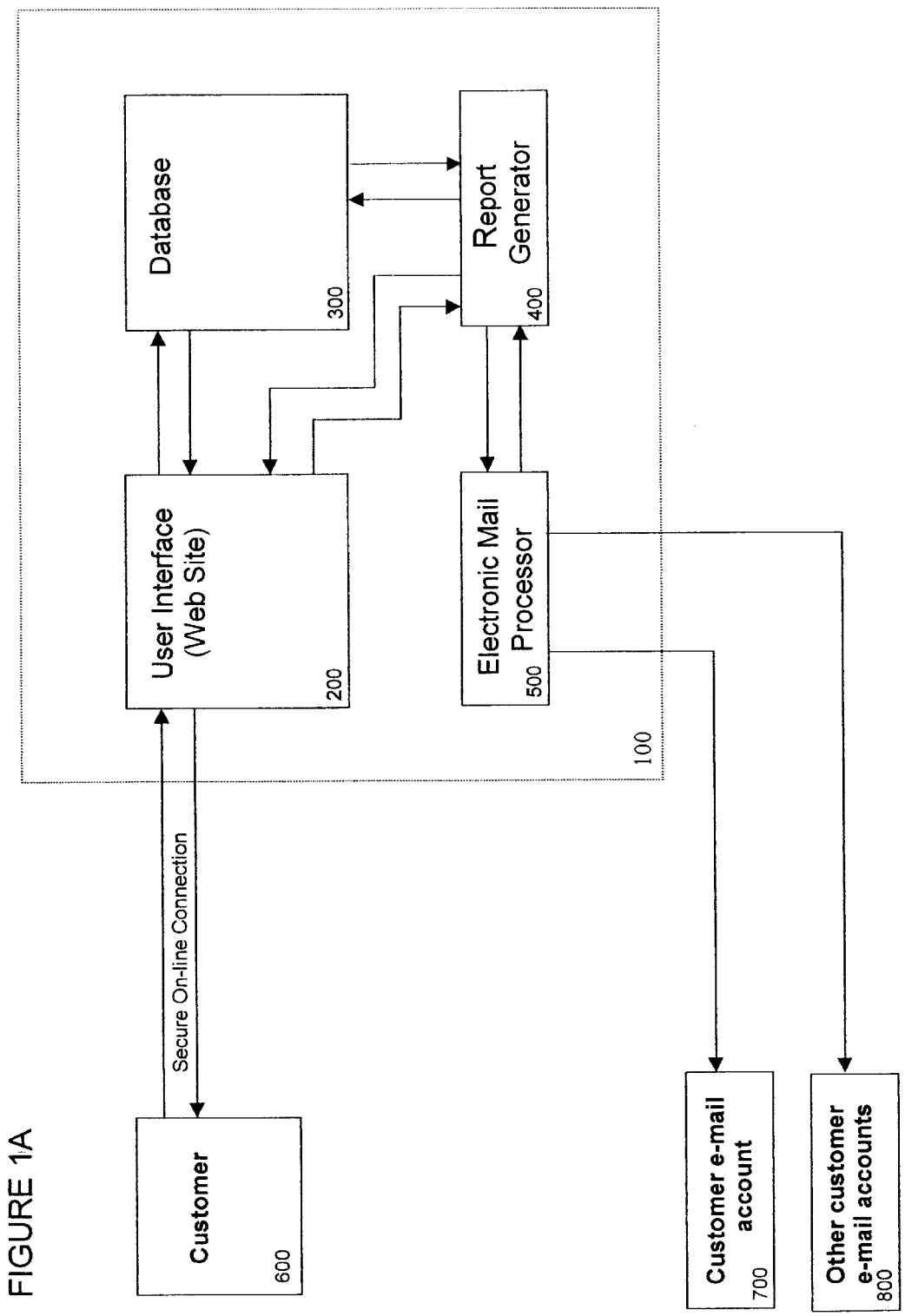

FIGURE 8

MARKET FAIR SHARE REPORT

Thursday, September 22, 1999

| | NUMBER OF ROOMS | FAIR SHARE | REPORTED OCCUPANCY | ROOMS SOLD | ACTUAL SHARE | VARIANCE FROM FAIR SHARE | A.D.R. | SHARE RANK |
|---|---|---|---|---|---|---|---|---|
| Radisson Hotel Memphis | 280 | 19.2% | 77.1% | 6,476 | 20.3% | 1.12% | $83.11 | 2 |
| Peabody | 468 | 32.1% | 83.8% | 11,766 | 36.9% | 4.83% | $101.12 | 1 |
| Holiday Inn Crowne Plaza | 402 | 27.5% | 67.8% | 8,177 | 25.6% | -1.90% | $87.52 | 4 |
| Holiday Inn Select | 186 | 12.7% | 53.6% | 2,991 | 9.4% | -3.36% | $75.83 | 5 |
| Sleep Inn | 124 | 8.5% | 67.0% | 2,492 | 7.8% | -0.68% | $56.55 | 3 |
| | 1,460 | | | 31,902 | | | | |

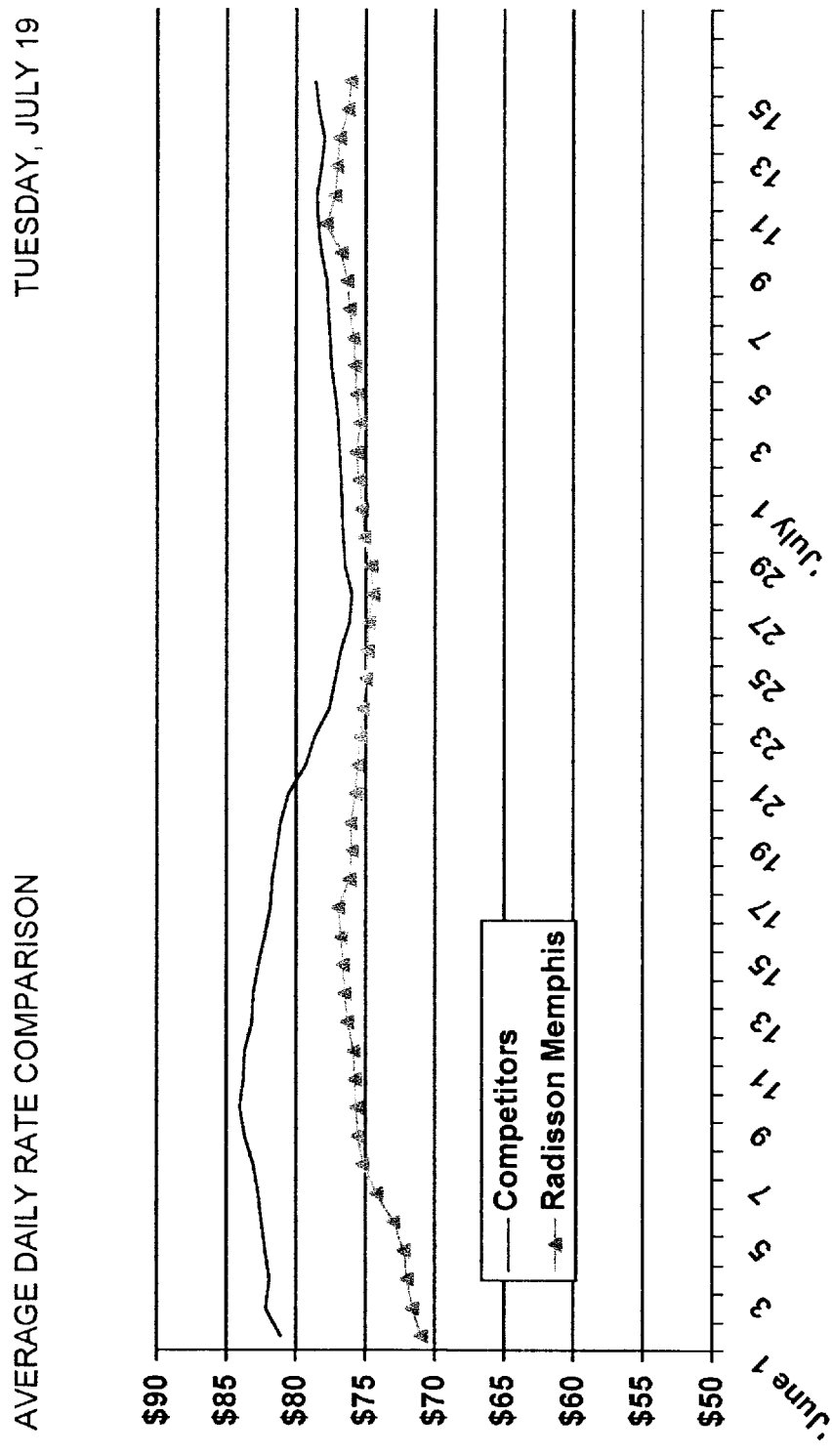

METHOD FOR THE EXCHANGE, ANALYSIS, AND REPORTING OF PERFORMANCE DATA IN BUSINESSES WITH TIME-DEPENDENT INVENTORY

TECHNICAL FIELD

This invention relates generally to a method and system for the exchange, analysis, and subsequent redistribution of performance data for businesses.

BACKGROUND OF THE INVENTION

Many businesses have highly perishable product inventories which are typically available in daily increments. These products can be sold in advance for consumption on a specific day, but if product remains unsold when the given day has elapsed it is lost for sale forever. Some examples of these industries include hotels, rental car companies, and airlines. In each of these cases, hotel rooms, rental cars, and airline seats can only be sold up to and until the present day. The opportunity to sell rooms, cars, and airline seats from past days does not exist.

As an example, let us assume that a hotel is engaged in the sale of rooms for July 10 of a given year. The hotel's room inventory for this day can be sold in advance on any day prior to July 10, and up to and including July 10. However, if the hotel fails to sell all of its July 10 inventory by that date, the opportunity for sale is lost forever. On July 11 it is not possible to sell unused July 10 rooms.

Any business in which unsold inventory is lost on a daily basis can be referred to as having time-dependent inventory, and can be referred to as a time dependent inventory (TDI) business.

For this reason, TDI businesses typically develop Yield Management Systems to optimize daily revenues. The purpose of these systems is to sell as much of the product inventory as possible for any given day, at the highest possible price.

Using the hotel business as an example, performance data from the sale of rooms includes two industry-standard measurements: the number of rooms sold divided by the number of rooms available for sale (occupancy percentage, or Occupancy,) and the average price of each room sold (Average Daily Rate, or ADR.) Occupancy is typically referred to as a percentage number, but may alternatively be expressed simply as the number of rooms sold. The ADR and occupancy performance data can be calculated over a period of a day, a week, a month, or any other time period. When calculated in this manner the values are referred to as the daily, weekly, and monthly ADR or occupancy. In the case of the hotel industry, the industry standard measurements, i.e. occupancy and ADR, can be processed to calculate a commonly used hotel industry measurement known as RevPAR. RevPAR is a type of processed performance data meaning "Revenue per Available Room" and can apply to any period of time desired—a day, week, month, quarter, or year as an example.

RevPAR can be calculated using different methods. In an embodiment relevant to the hotel industry the amount of room revenue realized by a hotel is divided by the number of rooms available in the hotel. For example, a 100 room hotel, earning $5000 in room revenue during a given day, has a RevPAR that day of $5000/100=$50.00.

In a second method of calculating RevPAR the ADR is multiplied by the occupancy percentage. For example, If the above hotel on the same day as above earned $5000 in revenue by selling 80 rooms at an ADR of $62.50, then:

Occupancy Percentage=80%
ADR=$62.50
RevPAR=$62.50×0.80=$50.00

Collectively, in a hotel application the two measurements of business operations, (ADR and Occupancy), and other measurements (such as RevPAR), which can be derived from them can be referred to as "performance data," and can again be referred to as daily, weekly, or monthly performance data.

In addition, for any TDI business, key measurements of business operations can be referred to collectively as 'performance data.'

Yield Management Systems in the hotel industry, either manual or computer-operated, seek to maximize daily occupied rooms (Occupancy) at the highest possible ADR. These systems rely upon several factors, including historical data, anticipated special events, the pace of reservation booking activity into the hotel, how many rooms are booked in advance for future dates, and the performance of other hotels in the local market area. Yield Management Systems must operate on a daily basis, making changes to each individual day's pricing, to maximize revenues over the long run.

Knowledge of other area hotel Occupancy rates and ADR's is important because it provides a guideline for setting the price of each room sold. If rooms are priced significantly higher than competitive hotels in the same market, fewer rooms may be sold, meaning less revenue earned. Conversely, if rooms are sold at a price significantly lower than competing hotels in a market, revenue will again be negatively impacted, as more could have been charged for rooms sold.

Again using a hotel example, another illustration of a clear need for daily Occupancy and ADR relates to high room demand in a market due to special events. At times, special regional events such as a football game or other athletic event, conventions, natural disasters, city and state sponsored functions, and other similar activities create a temporary surge in demand for hotel rooms in a given area. Typically, hotels prepare for the high demand by raising their prices for the duration of the event. However, frequently demand for the event may drop after the first day, or expected customers may fail to materialize. In this case, there is no current method for hotels to rapidly assess occupancy levels in competitive hotels in their market area, and make price adjustments accordingly. If market area occupancy levels remain high, a given hotel would typically continue high pricing. If occupancy in the market began to fall, the hotel has the opportunity to maximize revenue by dropping price and taking occupied rooms from competitors.

There are informal arrangements in some communities in which hotels exchange Occupancy, and ADR performance data at the end of a fiscal period; (typically monthly.) However, these arrangements are informal, often unreliable, and may be inaccurate. They also fail to provide the daily Occupancy and ADR information required to maximize revenues during the month.

In addition, there are businesses which have existed and continue to exist which report rate and occupancy numbers to hotels and their management companies. However, these services do not deliver daily Occupancy and ADR information to participating hotels. Generally, they operate with a 4 to 6 week delay between the end of a fiscal period and delivery of the subsequent report. As such, there is currently no way for hotels to reliably receive on a daily basis from competitive hotels the daily Occupancy and ADR information needed to maximize revenues.

In the same manner, in the rental car industry performance data related to the rental of automobiles can include two industry standard measurements: the Number of Rentals, which is the number of cars sold on any given day, and the Average Daily Rate (ADR), which is the total revenue received from the sale of cars divided by the number of cars sold.

In the cases of the hotel industry, the airline industry and the car rental industry, as well as other TDI industries, if there is a lag between the time of the operations represented by the performance data and the time when the processed data is available, the processed data can be of little value for certain purposes. For example, determining the pricing of a product for sale today based on performance data from last month or even last week can be irrelevant and unreliable.

Thus, one object of the present invention is to provide a system and method by which participating TDI businesses in a market area can reliably exchange daily performance data, and thereby use the information in the yield management process. In accordance with one aspect of this invention, there is provided a system and method for participating customers to transmit performance data to a database, utilizing the Internet or other public or private date transmission network.

In accordance with another aspect of the invention, there is provided a system and method for the extraction of the information from the database, and the subsequent combination, analysis, organization, and reporting in tabular and graphical format of the performance data.

In accordance with yet another aspect of this invention there is provided a system and method for transmitting the analyzed and organized data back to the TDI business customers when demanded by the customer, in the form of tables and graphical reports.

In accordance with yet another aspect of this invention there is provided a system and method for automatically transmitting a simplified version of the performance data report to members of client business management in the form of electronic mail.

Thus, one embodiment of the present invention provides TDI businesses with the data required for optimal yield management decisions in order to maximize revenues on a daily basis. The availability of this information on a daily basis allows TDI businesses greater cash flow and thereby higher profit levels to business ownership and management groups.

SUMMARY OF THE INVENTION

A method is taught for processing performance data in a data reporting system having a plurality of business entities and a report center in communication with the plurality of business entities. The method includes transmitting by the plurality of business entities to the report center customer performance data indicative of the operation of the business entities during a first day and processing of the customer performance data by the report center to provide processed performance data. Availability of the processed performance data is provided to a selected business entity during a second day wherein the time difference between the first day and the second day is less than eleven days. The processed performance data includes processed occupancy data, processed average daily rate data and processed RevPAR data. The method further includes determining price information in accordance with the processed performance data, pricing a product by the selected business entity in accordance with the determined price information, and selling the product according to the pricing. The processed performance data can be requested by the selected business entity prior to providing availability of the processed performance data.

Data can be transmitted by way of a network data connection and an internet connection.

BRIEF DESCRIPTION OF THE DRAWINGS

FIG. 1A shows a block diagram representation of the performance data processing system of the present invention;

FIG. 8 shows a representative report which can be generated using the method of the present invention;

FIGS. 9A and 9B show further representative reports which can be generated using the method of the present invention;

DETAILED DESCRIPTION OF THE INVENTION

Figure 1B:
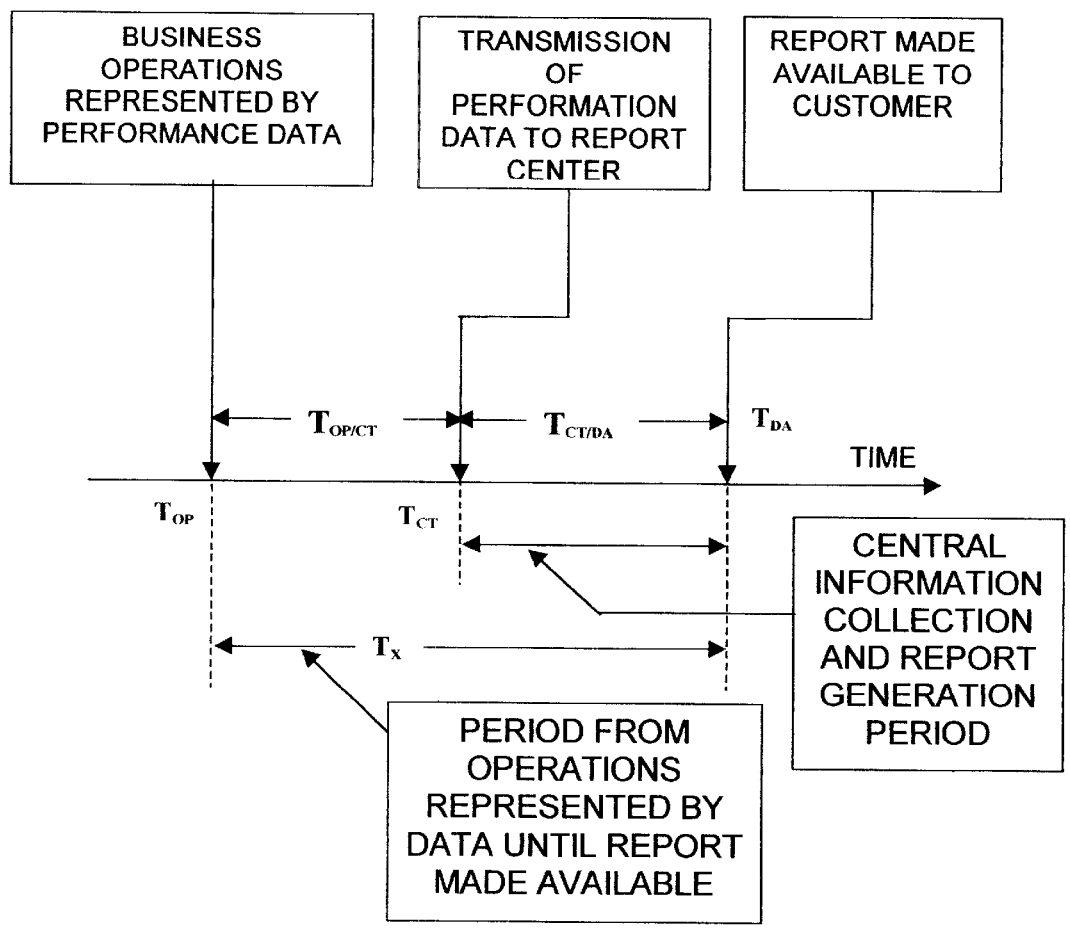
FIG. 1B shows a timeline representing selected time periods within the performance data processing method of the present invention.

Referring now to the drawings, FIG. 1A illustrates one embodiment of the present invention. As shown in FIG. 1A, a customer 600 of the business 100 utilizing this invention would use their computer system to establish a cryptographically protected (secure) on-line connection with the user interface 200, which is the portion of the system designed to interact with the customer, (this may take the form of an internet web site or web pages). The customer 600 then enters its performance data.

The performance data can include occupancy and ADR as discussed previously. The performance data entered by the customer travels to the user interface 200, and in turn is sent to the database 300. In alternate embodiments the TDI business client can enter the corresponding customer data including other types of performance data such as, for example, rental performance data or airline seating performance data. The system of the present invention can recognize when a customer 600 neglects to enter items of performance data that are required to provide a report. Under these circumstances the customer 600 can be prompted to enter the missing data by the system.

In one embodiment of the invention, the customer 600 can establish an on-line connection to the user interface portion of the system 200 in the manner described above, and request reports through the user interface 200, which in turn sends the request to the report generator 400. The report generator 400 then queries the Database 300 for the information required to assemble the report, and sends the report back to the user interface 200 and thence to the customer 600.

As an alternate embodiment of the present invention, a provision to enter data by telephone may be employed. In this alternate embodiment, the Customer 600 may establish a connection to the User Interface 200 directly through a telephone connection, and bypassing a computer. In this embodiment, the User Interface would direct the customer to enter data to the database through a series of voice prompts. The Customer 600 may also send data to the User Interface 200 by facsimile machine, or through an employee of the Business 100, acting as an intermediary. Furthermore, any method of entering data can be used by the customer.

In some cases, the performance data information produced by the system of the present invention is useful only if it is based upon customer data that is no more than, for example, ten days old. In other cases, the result is useful only when the data from the customer 600 is no more than one day old. Thus, in a preferred embodiment the performance data entered by the customer 600 should be indicative of the business operations of the customer 600 during as recent a period of operation as required for reliable use of the reports provided by the system of the present invention, depending on the uses made of the information. Furthermore, the central information collection and report generation period of the present invention should in general be as short as possible.

It is useful to distinguish between the various performance data parameters that are available from a report center and to determine the usefulness of the various parameters distinguished. In order to do this it is useful to formally define several of the possible parameters. In order to maximize the reliability and usefulness of the reports provided, the definitions of the possible parameters can be determined according to the time period between the operations represented by the performance data transmitted to the user interface 200 and the time that the report is made available.

Thus, the performance data parameter $D^P_x$, in a report can represent processed performance data made available at a report center based upon operations performed x days prior to the date when the report is made available. For example, $D^P_{10}$ can represent performance data based upon operations performed ten days prior to the availability of the report. In particular $OC_{10}$, $ADR_{10}$ and $RevPAR_{10}$ can represent the occupancy, ADR, and RevPAR information made available at the report center 100 based upon business operations performed ten days before the report.

Further details with respect to the processed performance data $D^P_x$ are set forth in FIG. 1B. As shown, the operations of a customer B to be monitored occur at $T_{OP}$. Performance data representative of the operations performed by B at time $T_{OP}$ are the subject of a customer transmission to the report center occurring at a time $T_{CT}$. The report center receives and processes the data from B and from a plurality of additional business entities in addition to B in this manner. A report based upon the performance data transmitted at time $T_{CT}$ is then made available by the report center at a time $T_{DA}$.

The variable x can then represent the number of days between the time $T_{OP}$ and the time $T_{DA}$.

In this manner, $$T_x = T_{OP/CT} + T_{CT/DA}$$

where:

$T_{OP/CT} = T_{CT} - T_{OP}$ =time from the business operations to the time of the customer transmission, $T_{CT/DA} = T_{DA} - T_{CT}$ =time from the customer transmission to the time the performance data of the report center is made available, and $T_x = T_{DA} - T_{OP}$ =time from the business operations indicated to the time the processed performance data is made available.

The value of $T_{OP/CT}$ is within the control of the customers 600 and it is to the advantage of the customers 600 to keep $T_{OP/CT}$ as short as possible. The time $T_{CT/DA}$ is determined by the report center. In the preferred embodiment of the invention $T_{CT/DA}$ should be one day or less. When the value of $T_x$, and hence the value of x, are determined in this manner the identity of the parameter representing the processed data value $D^P_x$ is known. As previously described, the usefulness of the various parameters $D^P_i$, i=0, . . . 10, . . . , can vary significantly.

For example, when the pricing of TDI products is performed using the reports from the report center, the parameter $D^P_x$, X>10, may be of very little value. Since the parameters $D^P_x$, X≦10, have not been available in the prior art, attempts to use the parameters $D^P_x$, X>10, to estimate pricing were made. However, pricing performed in this manner was usually unreliable. Thus, the use of a method to determine $D^P_x$ for smaller values of x can substantially improve the reliability and relevancy of the pricing of TDI products. For example, being able to receive a daily RevPAR, daily occupancy, or daily RevPAR based on information that is only one day old is very valuable for determining pricing information.

Referring again to FIG. 1A, at a predetermined time on a daily basis the electronic mail processor 500, polls the report generator 400 to produce a report for each customer listed in its database. While the system of the invention can be used to provide processed performance data only to customers 600 that input performance data into the system, it will be understood that customers can agree to make the data available to other entities if desired. The electronic mail processor can then e-mail the report to each customer e-mail account 700 and 800. The time between the transmission of the customer data from the customer 600 to the business 100 until the time that the report is made available to the customer 600 can be arbitrarily short. For example, under favorable conditions the report can be made available to the customer 600 on the same day the customer data is received. Under other conditions the period between the transmission of the customer data and the availability of the report can be ten days or more. transmission of the customer data and the availability of the report can be ten days or more.

Figure 2:
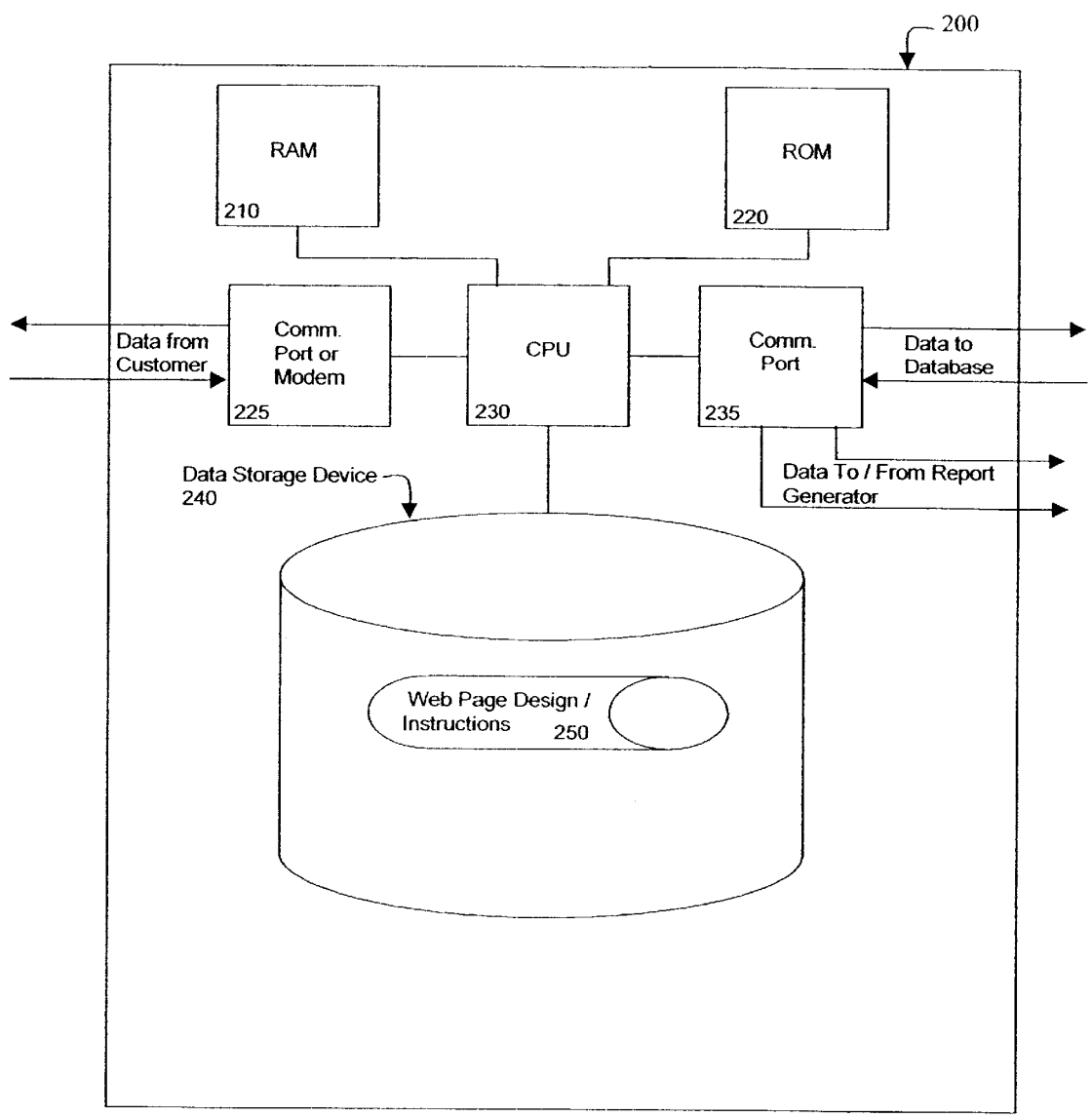
FIG. 2 shows a more detailed representation of a portion of the performance data processing system of the FIG. 1A.

FIG. 2 depicts a block diagram of the user interface 200 portion of present invention. The user interface includes a CPU 230, and associated memory (210, 220) in order to process: (1) requests to access (log onto) the system from customers 600; (2) data sent to and from customers 600; (3) data sent to and from the database 300; (4) data sent to and from the report generator (400). The CPU 230 is connected to customers 600 through a communication port or modem 225, and to the database 300 through a communications port 235. In addition the CPU 230 is connected to a data storage device 240 which contains several sets of programmed instructions, among which is the instructions for creation of the user interface (or web page design) 250.

Referring to FIG. 2, when a customer completes an Internet, on-line, or other network data connection to the user interface, through the Communications port or modem 225, the CPU will retrieve from the Data Storage Device 240 a copy of the log-on, or initial web site page from the Web Page Design instructions 250 transmits it to the customer via the on-line connection. When the customer completes the log-on page and transmits log-on data back to the CPU 230 via the on-line connection through communications port or modem 225, the CPU 230 then communicates with the Database 300 via Communication Port 235, and compares log-on data supplied by the customer with that from the Database 300 to determine if access to the remainder of the system 100 should be granted.

If and when access is authorized, the CPU 230 will access the Web Page Design 250 instructions as required to provide an interactive means for the customer to either: (1) input data, or (2) request a report.

If Data Input is selected, the CPU 230 will access the Database 300 to determine which daily occupancy and ADR records have not previously been transmitted by the Customer. The User Interface will then access the Web Page Design 250 instructions to create and transmit a data entry page for the customer, including a request for the customer to input the missing days. When the customer completes the page, data is transmitted to the CPU 230 via the on-line connection. The CPU 230 then formats the data in a manner appropriate for the Database 300, and transmits the information to the Database via the Communications port 235. If the customer requests a report, the CPU 230 will access the Web Page Design 250 instructions to display a report selection page for the customer. When the customer completes the page, data is transmitted to the CPU 230 via the on-line connection. The CPU 230 then transmits the request to the Report Generator 400. When the Report Generator has assembled the required report, it transmits the data back to the CPU 230 through the communications port 235. The CPU 230 then accesses the Web Page Design instructions 250, compiles the information with that sent as described above by the report generator, and transmits the completed report via the on-line connection to the customer.

Figure 3:
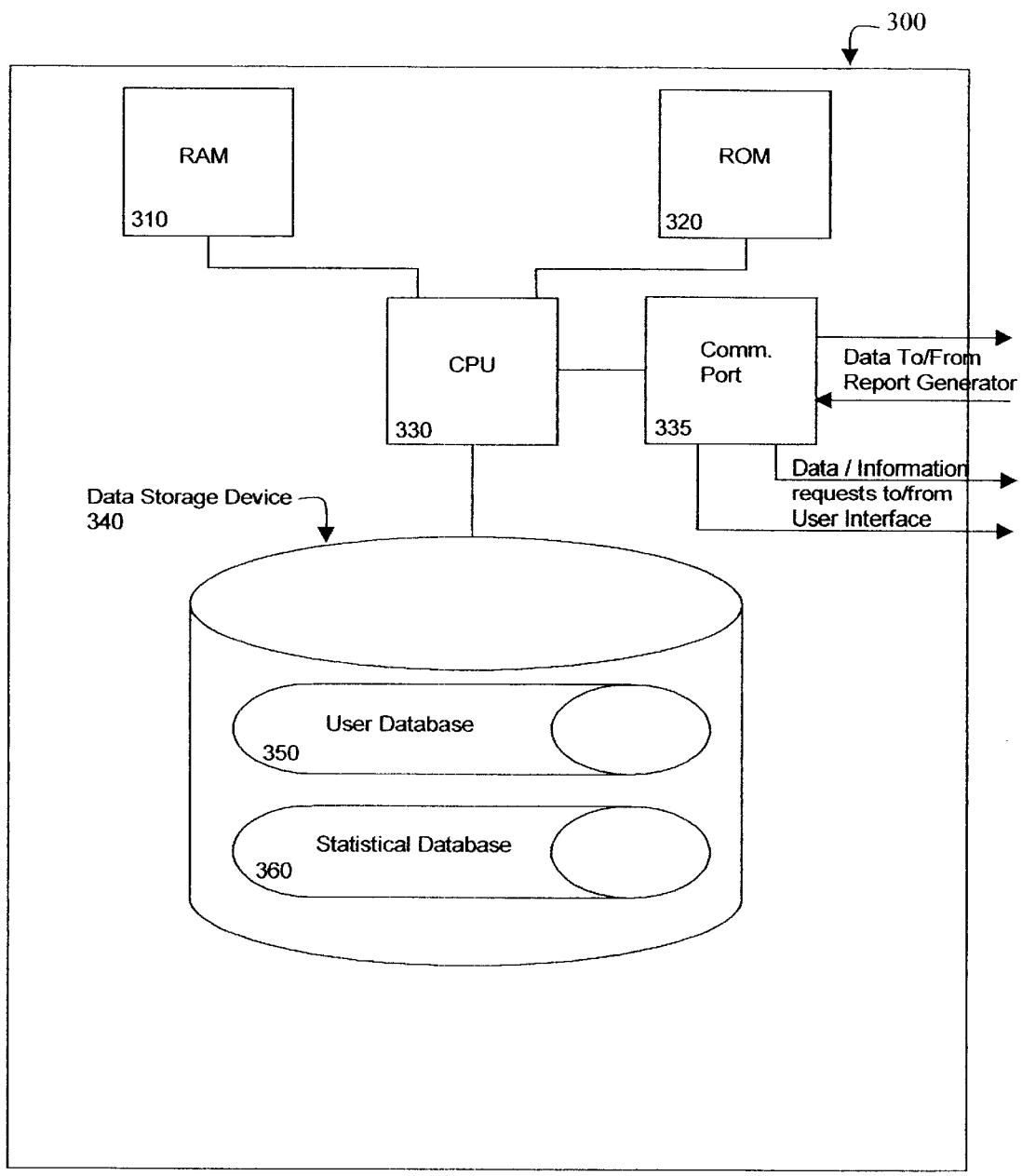
FIG. 3 shows a more detailed representation of a portion of the performance data processing system of the FIG. 1A.

FIG. 3 depicts a block diagram of the Database 300 portion of the present invention. The database includes a CPU 330, and associated memory (310,320) in order to process: (1) requests for data from the User Interface 200, (2) rate and occupancy or other performance data sent from the User Interface 200; (3) requests for data from the Report Generator 400. The CPU 330 is connected to the User Interface 200 and to the Report Generator 400 through a communications port 335. In addition the CPU 330 is connected to a data storage device 340 which contains several databases, among which is the User Database 350 and a Statistical Database 360.

Referring to FIG. 3, from time to time the CPU 330 may receive a query for log-on data from the User Interface 200 through the Communications Port 335. The CPU 330 then accesses the Data Storage Device 340 and retrieves the required information from the User Database 350. It then transmits the data back to the User Interface through Communications Port 335. The CPU 330 may also receive Occupancy and ADR data to be stored from the User Interface 200 through the Communications Port 335. In this case, the CPU 330 formats the data in a manner appropriate for the Statistical Database 360, accesses the Data Storage Device 340, and updates the Statistical Database 360.

Figure 4:
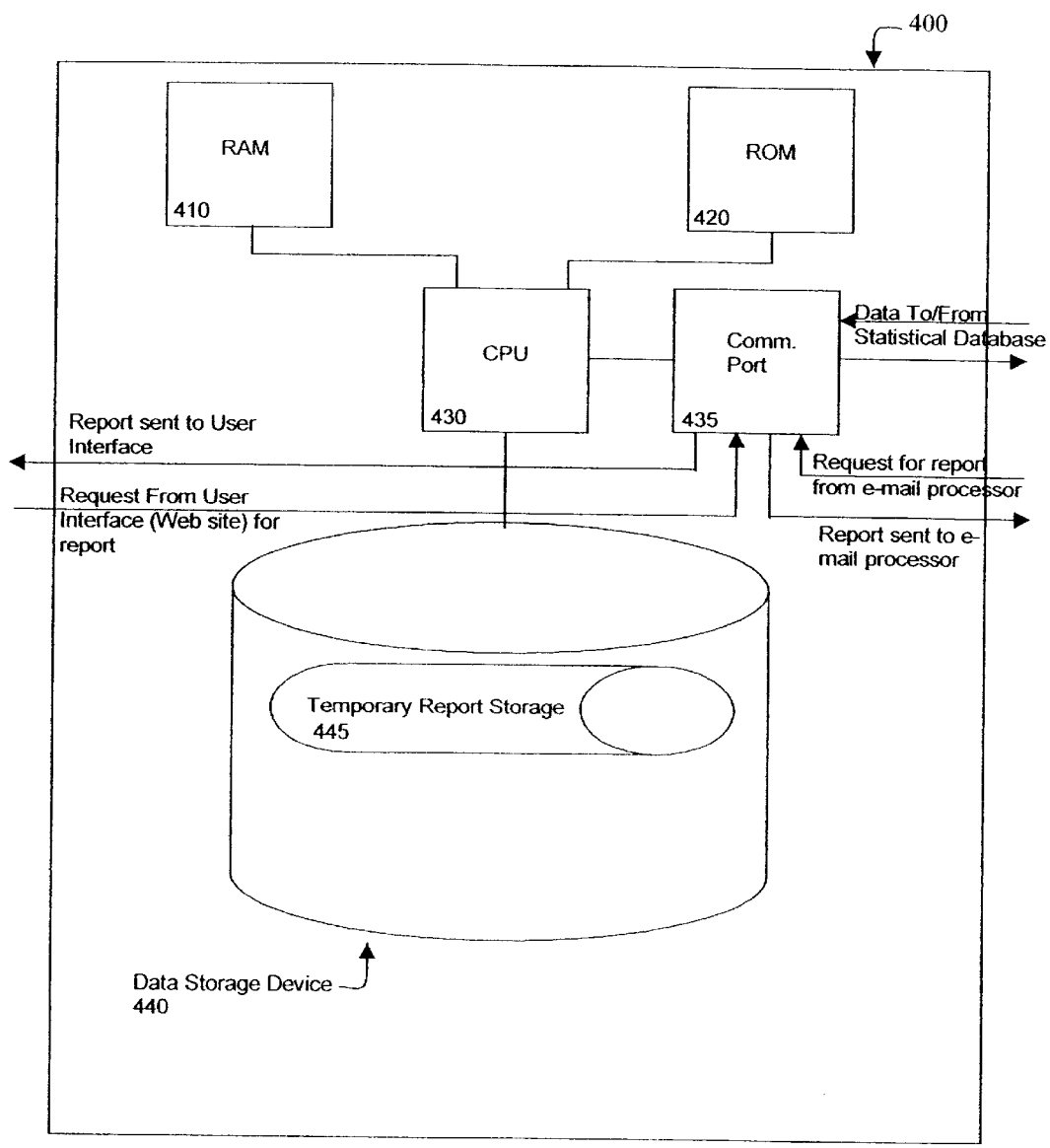
FIG. 4 shows a more detailed representation of a portion of the performance data processing system of the FIG. 1A.

The CPU 330 may also from time to time receive a request from the Report Generator 400 through Communication Port 335 for data from the Statistical Database. In this case, the CPU 330 accesses the Data Storage Device 340, reads the Statistical Database 360, formats the information in the manner required, and transmits the data to the Report Generator 400 through the Communication Port 335. FIG. 4 depicts a block diagram of the Report Generator 400 portion of the present invention. The Report Generator includes a CPU 430, and associated memory (410, 420) in order to process: (1) requests for reports from the User Interface 200; (2) requests for data to/from the Statistical Database 300; (3) requests for reports from the Electronic Mail Processor 500. The CPU 430 is connected to the User Interface 200, the Database 300, and the Electronic Mail Processor 500 through a communications port 435. In addition the CPU 430 is connected to a data storage device 440 which may contain several sets of files, among which is the Temporary Report Storage 445.

Referring to FIG. 4, the CPU 430 will upon occasion respond to requests for reports from the User Interface 200 through the Communications Port 435. The CPU 430 will first access the Data Storage Device 440, locate the Temporary Report Storage Database 445, and determine if the report was previously compiled and stored. If not, the CPU 430 will request the data required to compile the reports from the Database 300 through the Communications Port 435. After receiving the data from the Database 300 through the Communications Port 435, the CPU 430 will process the data and assemble it into a graphical or tabular report. A copy of the report will be placed in Temporary Report Storage 445 residing in the Data Storage Device 440, where it remains for a pre-determined period of time.

The CPU 430 will also respond to requests for reports from the Electronic Mail Processor 500 through Communication Port 435, typically at the same time daily. In this case, the CPU 430 will request the data required to compile the reports from the Database 300 through the Communications Port 435. After receiving the data from the Database 300 through the Communications Port 435, the CPU 430 will process the data and assemble it into a tabular report, and transmit it to the Electronic Mail Processor 500 through the Communications Port 435.

Figure 5:
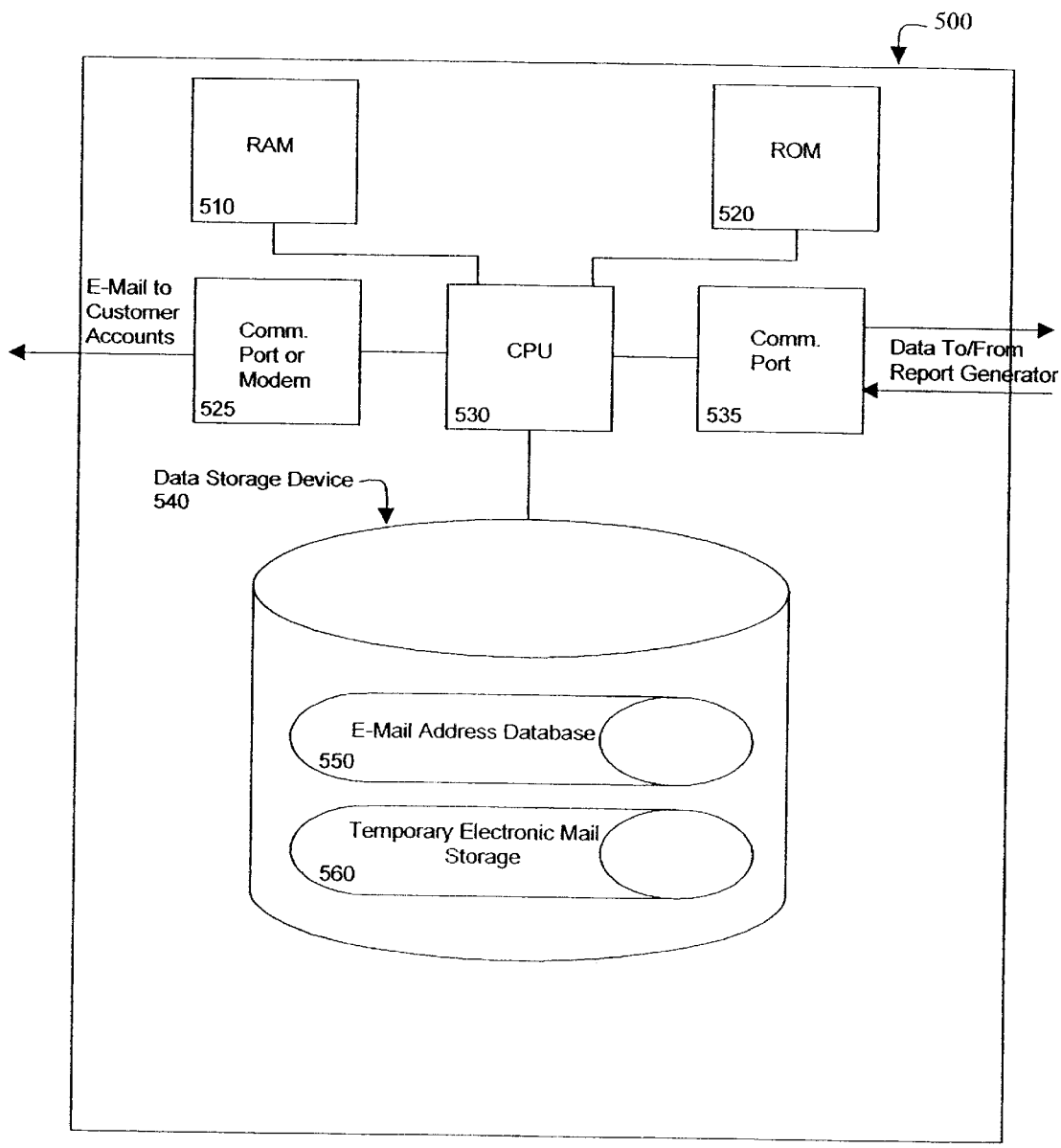
FIG. 5 shows a more detailed representation of a portion of the performance data processing system of the FIG. 1A.

FIG. 5 depicts a block diagram of the Electronic Mail Processor 500 portion of the present invention. The Electronic Mail Processor includes a CPU 530, and associated memory (510,520) in order to process: (1) data from the Report Generator 400 and (2) internal instructions (programming) from the E-Mail Processing Program 560. The CPU 530 is connected to the Report Generator 400 through a communications port 535, and is also connected to a communications port or modem 525 for the purpose of sending electronic mail. In addition the CPU 530 is connected to a data storage device 540 which may contain several sets of files, among which is the E-Mail address Database 550, and the Temporary Electronic Mail Storage Database 560.

Referring to FIG. 5, the CPU 530 will access the Data Storage Device 540 at a pre-determined time each day to retrieve the records of each customer receiving an e-mail report from the E-Mail Address Database 550. The CPU will then transmit a report request to the Report Generator 400 through the communications port 535. Compiled reports from the Report Generator 400 are received by the CPU 530 through the Communication Port 535. The CPU 530 uses the Data Storage Device 540 to access the Temporary Electronic Mail Storage Database 560 files, and store the series of e-mail reports. The CPU then accesses the Data Storage Device 540 to open the Temporary Electronic Mail Storage Database 560 and retrieve the first customer report to be e-mailed. The CPU uses the Communications Port or Modem 525 to establish an on-line connection with the Customer's e-mail account 700, and transmits a copy of the e-mail report. This process repeats sequentially until all reports stored in the Temporary Electronic Mail Storage Database have been retrieved and sent to Customer E-Mail accounts 800 as described above.

Figure 6:
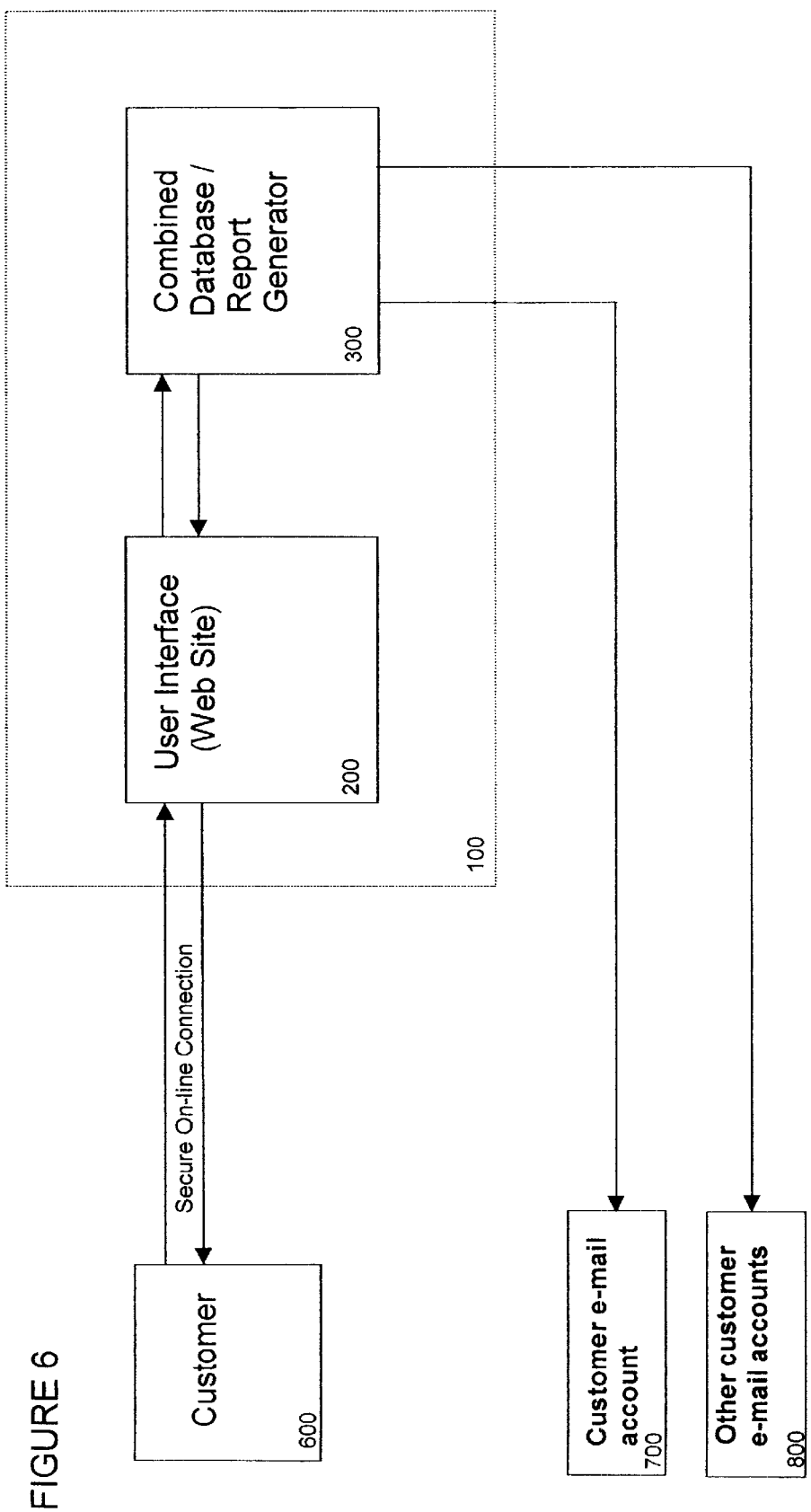
FIG. 6 shows a block diagram representation of an alternate embodiment of the performance data processing system of FIG. 1.

The above embodiment of the present invention depicts operation of the invention on a network computer system, or a system utilizing separate computers and/or processors for the various portions of the invention. Referring now to the drawings, FIG. 6 illustrates an alternate embodiment of the present invention, in which the Database 300, the Report Generator 400, and the Electronic Mail Processor 500 reside on the same computer system and share a common CPU and data storage device. In this embodiment, as shown in FIG. 6, a customer 600 of the business 100 utilizing this invention would use their computer system to establish a cryptographically protected (secure) on-line connection with the user interface 200, which is the portion of the system designed to interact with the customer, (this may take the form of an internet web site or web pages). The customer 600 then enters Occupancy, ADR, and/or other performance data, which travels to the user interface 200, and in turn is sent to the Combined Database/Report Generator 300.

The customer 600 can establish an on-line connection to the user interface portion of the system 200 in the manner described above, and request reports through the user interface 200, which in turn sends the request to the Combined Database/Report Generator 300. The report generator then assembles the report, and sends the report back to the user interface 200 and thence to the customer 600.

In addition, at a predetermined time on a daily basis the Combined Database/Report Generator 300 produces a simplified e-mail report for each customer listed in its database. The electronic mail processor then e-mails the report to each customer e-mail account 700 and 800.

Figure 7:
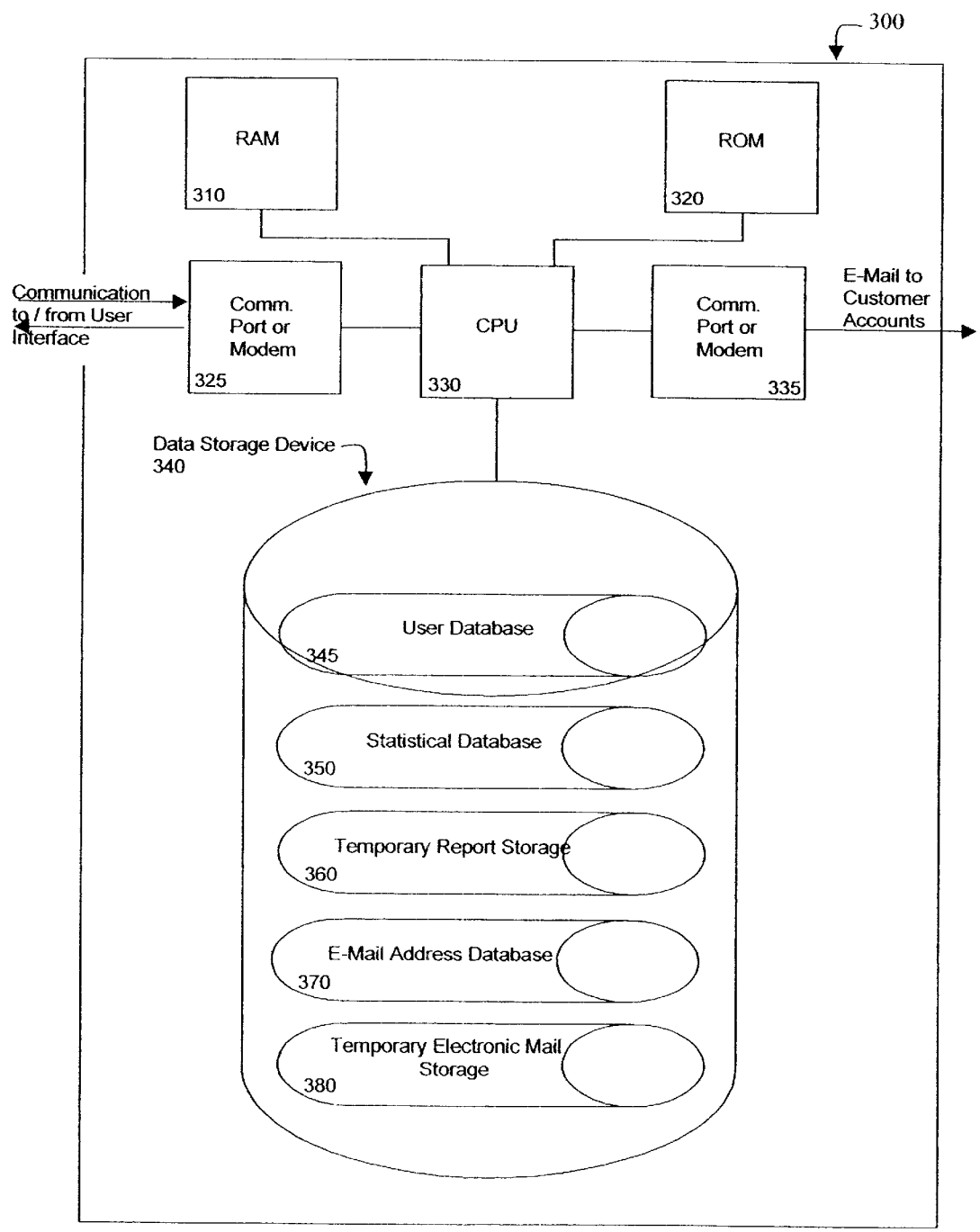
FIG. 7 shows a more detailed representation of the performance data processing of the alternate embodiment of FIG. 6.

FIG. 7 depicts a block diagram of the Combined Database/Report Generator 300 portion of the alternate embodiment. The Combined Database/Report Generator includes a CPU 330, and associated memory (310,320) in order to process: (1) requests for reports from the User Interface 200, (2) rate and occupancy data sent from the User Interface 200, (3) electronic mail messages sent to customer accounts 700 and 800. The CPU 330 is connected to the User Interface 200 through a communications port 325. In addition the CPU 330 is connected to a data storage device 340 which contains several databases, among which is the User Database 345, the Statistical Database 350, the Temporary Report Storage, 360, the E-Mail Address Database 370, and the Temporary Electronic Mail Storage Database 380.

In this alternate embodiment, the User Interface portion of the present invention is substantially the same as discussed previously in FIG. 2.

Referring to FIG. 7, from time to time the CPU 330 may receive a query for log-on data from the User Interface 200 through the Communications Port 325. The CPU 330 then accesses the Data Storage Device 340 and retrieves the required information from the User Database 345. It then transmits the log-on data back to the User Interface 200 through Communications Port 325. The CPU 330 may also receive Occupancy and ADR data to be stored from the User Interface 200 through the Communications Port 325. In this case, the CPU 330 formats the data in a manner appropriate for the Statistical Database 350, accesses the Data Storage Device 340, and updates the Statistical Database 350.

The CPU 330 may also from time to time receive a request for a report from the User Interface 200 through Communication Port 325. In this case, the CPU 430 will first access the Data Storage Device 340, locate the Temporary Report Storage Database 360, and determine if the report was previously compiled and stored. If not, the CPU 330 will request the data required to compile the reports from the User Database 345. After receiving the data, the CPU 330 will process the data and assemble it into a graphical or tabular report. A copy of the report will be placed in Temporary Report Storage 445 residing in the Data Storage Device 340, where it remains for a pre-determined period of time.

In this alternate embodiment the CPU 330 will also maintain the current date and time. At designated intervals, typically at the same time daily, the CPU 330 will access the Data Storage Device 340 at a pre-determined time each day to retrieve the records of each customer receiving an e-mail report from the E-Mail Address Database 370. The CPU 340 will then access the Statistical Database 350 to retrieve the information necessary to compile an e-mail report for that customer. The CPU will then access the Data Storage Device 340 to place a copy of each customer E-Mail report in the Temporary Electronic Mail Storage Database 370. This process will repeat sequentially until all customer e-mail reports are prepared.

The CPU then accesses the Data Storage Device 340 to open the Temporary Electronic Mail Storage Database 380 and retrieve the first customer report to be e-mailed. The CPU uses the Communications Port or Modem 325 to establish an on-line connection with the Customer's e-mail account 700, and transmits a copy of the e-mail report. This process repeats sequentially until all reports stored in the Temporary Electronic Mail Storage Database have been retrieved and sent to Customer E-Mail accounts 800 as described above.

FIG. 8 is an illustration of one type of report available through the present invention, utilizing a hotel example. The report of FIG. 8 is in an industry-standard format known as a Market Fair Share Report. The Market Fair Share Report includes Occupancy, ADR, and RevPAR, along with various calculations used to analyze them. For the purpose of illustration, it should be assumed that the first hotel listed, the Radisson Memphis, is the hotel requesting this report. However, all hotels listed are customers of the business utilizing the present invention.

Columns 1 and 2 of FIG. 8 indicate each hotel property analyzed in this report, and the number of rooms available for sale at each hotel. This information is derived from the User Database 350. Column three, Fair Share, is calculated from column 2, and represents each hotel's room count as a percentage of the total number of available rooms listed in column 2. As an example, the Radisson Memphis with 280 rooms has 19.2% of the total available room count of 1460 rooms. The Peabody Hotels has 32.1% of the available room count, etc.

Column 4, Reported Occupancy, is supplied by each client hotel as part of performance data through the present invention as related in the discussion of FIGS. 1 and 2. Alternatively, Column 4 can be calculated if the client supplies rooms sold instead of a percentage occupancy number as discussed in the Detailed Description section. In this alternate embodiment of the report, column 4 would be calculated by dividing the Rooms Sold number provided by the client as Occupancy Data, by Column 2, the number of rooms available at the hotel. Thus, the report center provides occupancy performance data with respect to the plurality of business entities sharing performance data. Furthermore, the system of the present invention can be used to provide any type of performance data desired by the customers provided that the customers provide the individual customer performance data required to calculate it.

Column 5, Rooms Sold, is calculated by multiplying Column 2, the number of rooms available, and column 4, the reported occupancy, and rounded to the nearest whole room. Alternatively, as discussed in the Detailed Description Section and FIGS. 1 and 2, the customer can supply the number of rooms sold through the present invention as the Occupancy Data, and the report will calculate the Occupancy by dividing rooms sold by the Number of Rooms Available in Column 2.

Column 6, Actual Share, is calculated by dividing the Rooms Sold number for each hotel in Column 5, by the total of Column 5. As an example, the Radisson Hotel Memphis, with 216 rooms sold, accounted for 20.3% of the total 1063 rooms sold, while the Peabody had 36.9% of the rooms sold.

Column 7, Occupancy Variance from Fair Share, is the difference between Column 6 and Column 3 for each hotel, and is calculated by subtracting Column 3 from Column 6. As an example the Radisson Memphis had 20.3% of the Rooms Sold in Column 6, while contributing a share of 19.2% of available rooms in Column 3. Column 6 less Column 3 is 1.1%. The Radisson Memphis enjoyed a positive variance of 1.1%, in that its percentage of rooms sold was greater than its contribution of available rooms.

In the same manner, the Holiday Inn Select contributed 12.7% of the available rooms as indicated in Column 3, but contributed only 9.4% of the sold rooms as shown in Column 6. The conclusion from these two hotel examples is that since the Radisson had a positive Occupancy Variance From Fair Share in Column 7 it performed relatively well in Occupancy compared to other reporting hotels, while the Holiday Inn Select performed relatively poorly.

Column 8, the ADR, is derived from clients through the present invention in the manner previously described. Column 9 is calculated for each client hotel by multiplying Column 4 by Column 8. As an example, the Radisson Memphis Calculated RevPAR of $75.64 is produced by multiplying the reported ADR of $98.11 in Column 8 by 77.1% Occupancy (0.771) from Column 4, in the manner described for calculating RevPAR. The result, $75.64, is set forth as the RevPAR for the Radisson Memphis in Column 9. Thus, the report center also provides ADR performance data with respect to a plurality of business entities.

Columns 10, 11, and 12 rank Occupancy Fair Share, ADR, and RevPAR performance respectively from Columns 7, 8, and 9. As an example, in Column 10 the Peabody Hotel earned the highest Occupancy Fair Share Variance from Column 7, followed by the Radisson Memphis, Sleep Inn, Holiday Inn Crowne Plaza, and Holiday Inn Select, respectively.

Figure 9B:
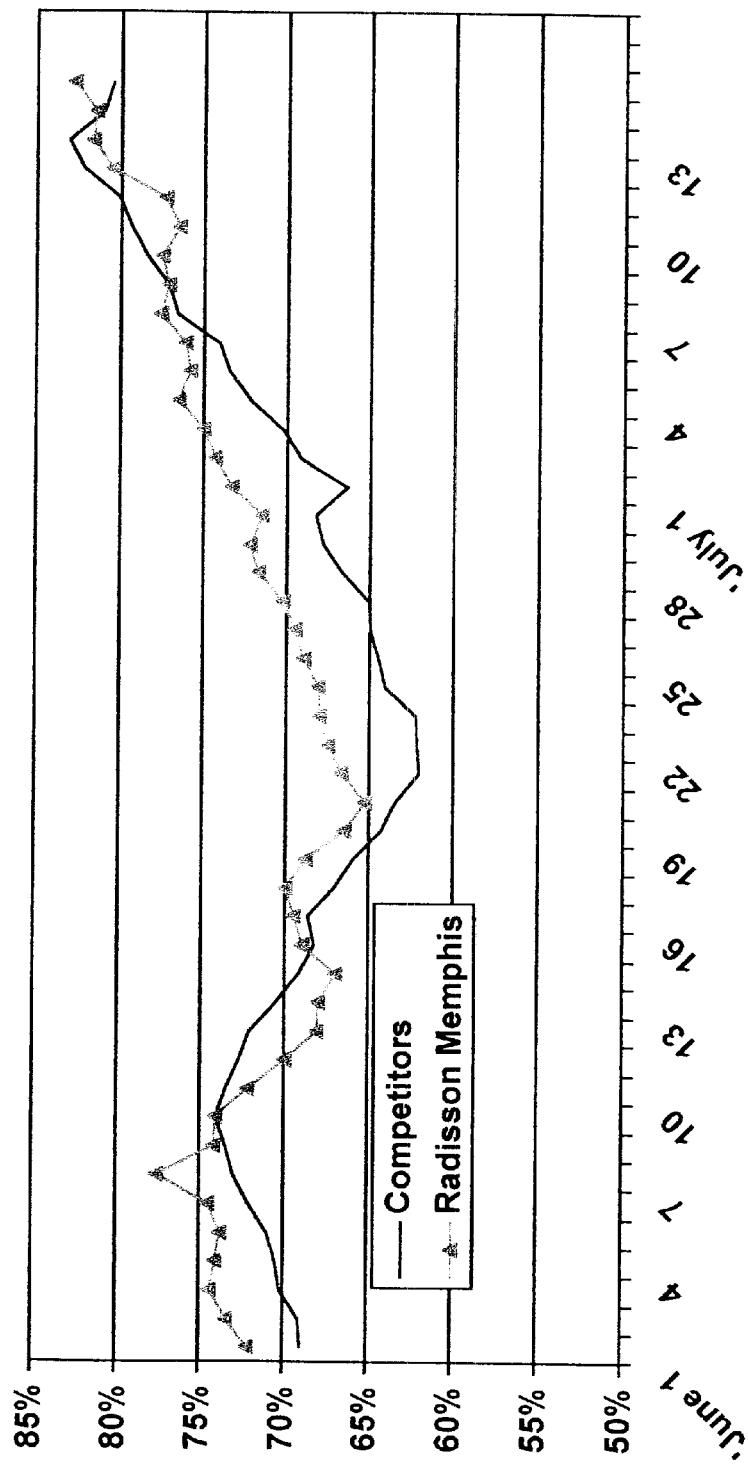

FIGS. 9A and 9B illustrate two other reports available within the present invention. Again using the hotel example, these reports present comparisons of customer ADR and Occupancy information to the information of their competitors in a graphical manner for ease of use. Performance is calculated for a period of time from the present day to 45 days in the past.

Referring to FIG. 9A, it is assumed the client hotel ordering the report is again the Radisson Memphis. In this embodiment, the ADR of the Radisson Memphis, supplied by the hotel through the present invention as previously discussed is displayed by the blue line, depicting 45 days of past information. All other competitive client hotels are summarized by the red line, representing an amalgamation of their ADR as they reported through the present invention. In this example, it is clear that over the 45 days covered in this report the Radisson Hotel Memphis is earning a lower ADR than the competitive group, although the difference is narrowing.

Referring to FIG. 9B, it is again assumed that the client hotel ordering the report is the Radisson Memphis. In this embodiment, the Occupancy of the Radisson Memphis, supplied by the hotel through the present invention as previously discussed is displayed by the blue line depicting 45 days of past information. All other competitive client hotels are summarized by the red line, representing an amalgamation of their Occupancy as they reported through the present invention. In this example, it is clear that from June 16 through July 9 the Radisson Hotel Memphis achieved a higher level of occupancy than the competitive group.

Figure 10A:
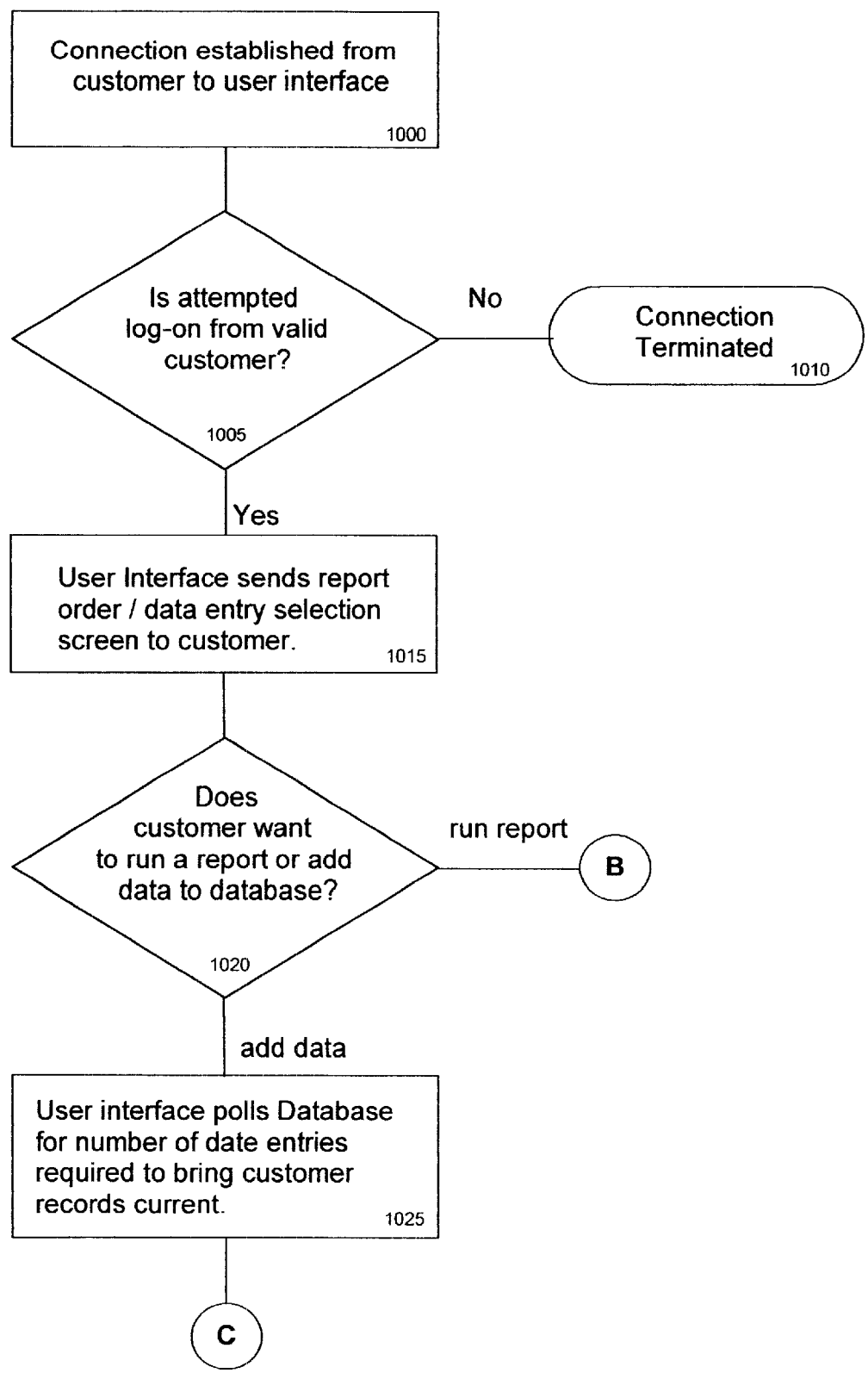
FIGS. 10A and 10B show a flow chart representation of a portion of the method of the present invention.
Figure 10B:
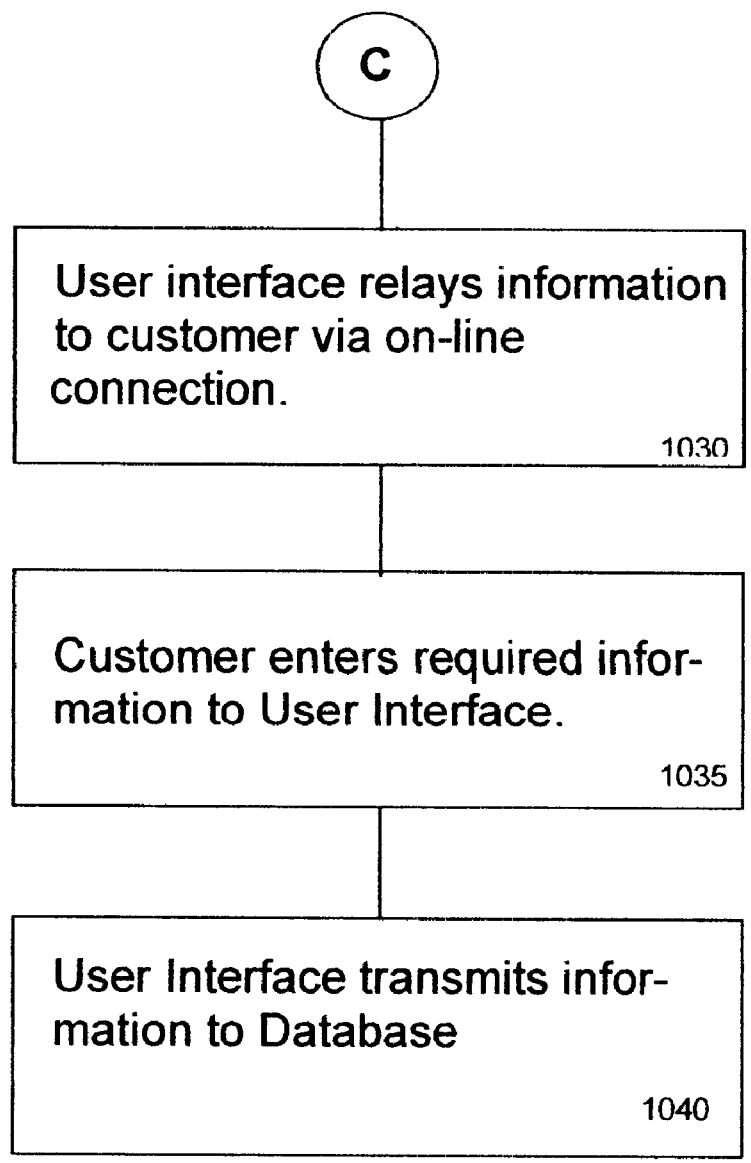

FIGS. 10A and 10B are flow charts illustrating an exemplary process by which a Customer 600 utilizes the invention 100 to transfer rate and occupancy data into the Database 300. Referring to FIG. 10a, in step 1000 the Customer 600 utilizes their computer, internet software, and modem to establish an on-line connection with the User Interface 200 portion of the invention. The User Interface 200 responds to the Customer connection by building and transmitting to the Customer 600 a log-on screen, step 1005, as a means to determine if the Customer 600 is an authentic and authorized user of the system. If the Customer 600 cannot provide appropriate password and authentication data, the connection is terminated, step 1010. If the Customer 600 is supplies the correct authentication data, in step 1015 the User Interface 200 builds and sends a menu page to the Customer 600, among the contents of which are options to: (1) order a report or (2) post Customer data to the Database 300.

The Customer 600 makes a selection between these options, and in step 1020 indicates a selection to the User Interface 200 via the on-line connection. If the selection is to run a report, this condition is explained later in the discussion of FIGS. 11A and 11B. If the Customer 600 elects to post data to the Database 300, the User Interface 200 will poll the Database 300 for all dates which have not been previously sent to the Database 300, step 1025.

The User Interface 200 compiles a data entry page, and sends the required dates with a format for entry to the Customer 600 via the on-line connection, step 1030. In step 1035, the Customer 600 completes the entry form and sends the information to the User Interface. In step 1040, the User Interface 200 sends the Customer supplied information to the Database 300.

Figure 11A:
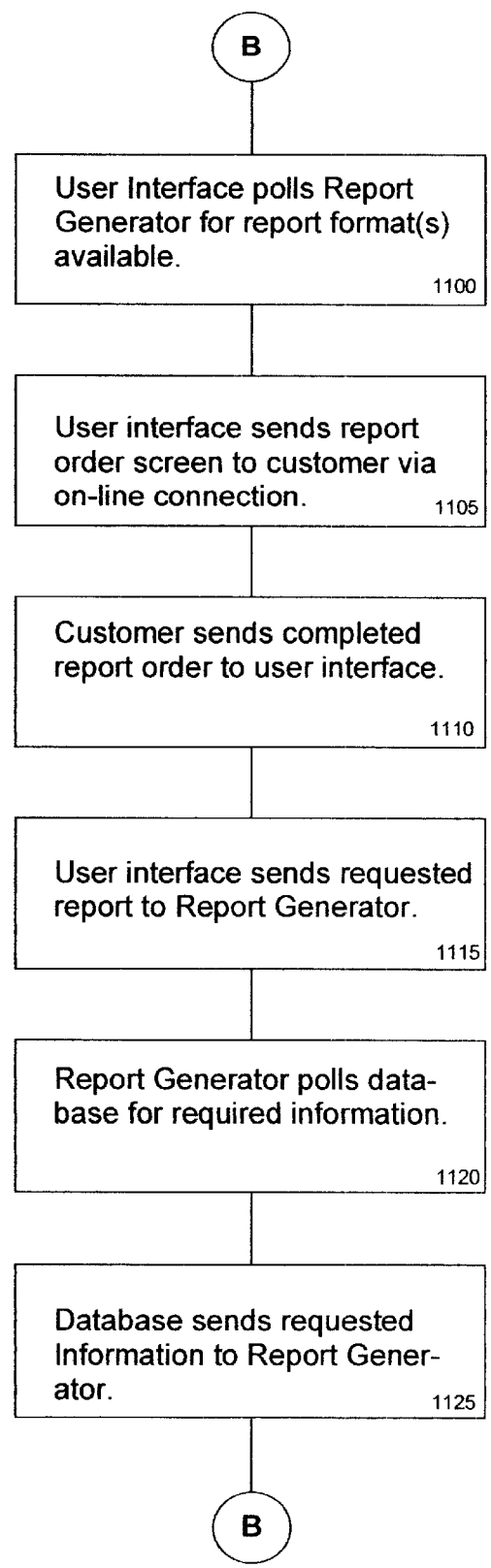
FIGS. 11A and 11B show a flow chart representation of a portion of the method of the present invention.
Figure 11B:
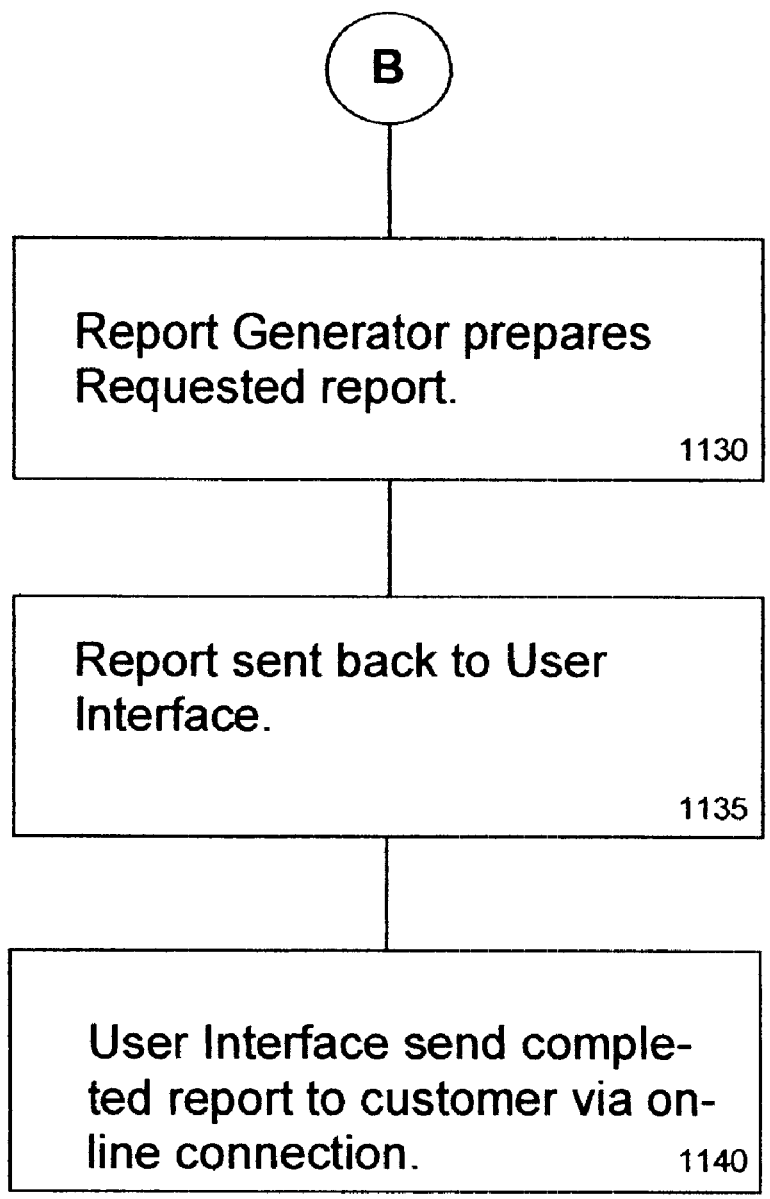

FIGS. 11A and 11B are flow charts illustrating the process by which the Invention 100 processes a Customer 600 request for a report. As referred to above in step 1020, if the Customer 600 elects to run a report, the User Interface 200 polls the Report Generator 400 for the report formats available, step 1100. In step 1105, the User Interface uses this information to build and transmit a report order screen to the Customer 600.

The Customer 600 completes the report order page with the requested reports and date ranges, and transmits the information back to the User Interface 200 via the on-line connection in step 1110. In step 1115, the User Interface 200 relays the report parameters entered by the Customer 600 to the Report Generator 400. The Report Generator 400 then polls the Database 300 for the data required to produce the report in step 1120. In step 1125 the Database 300 sends the required data to the Report Generator 400, and the Report Generator 400 prepares the requested report in step 1130. In step 1135 the Report Generator 400 sends the completed report to the User Interface 200, which builds a screen incorporating the report, and sends it to the Customer 600 in step 1140.

Figure 12A:
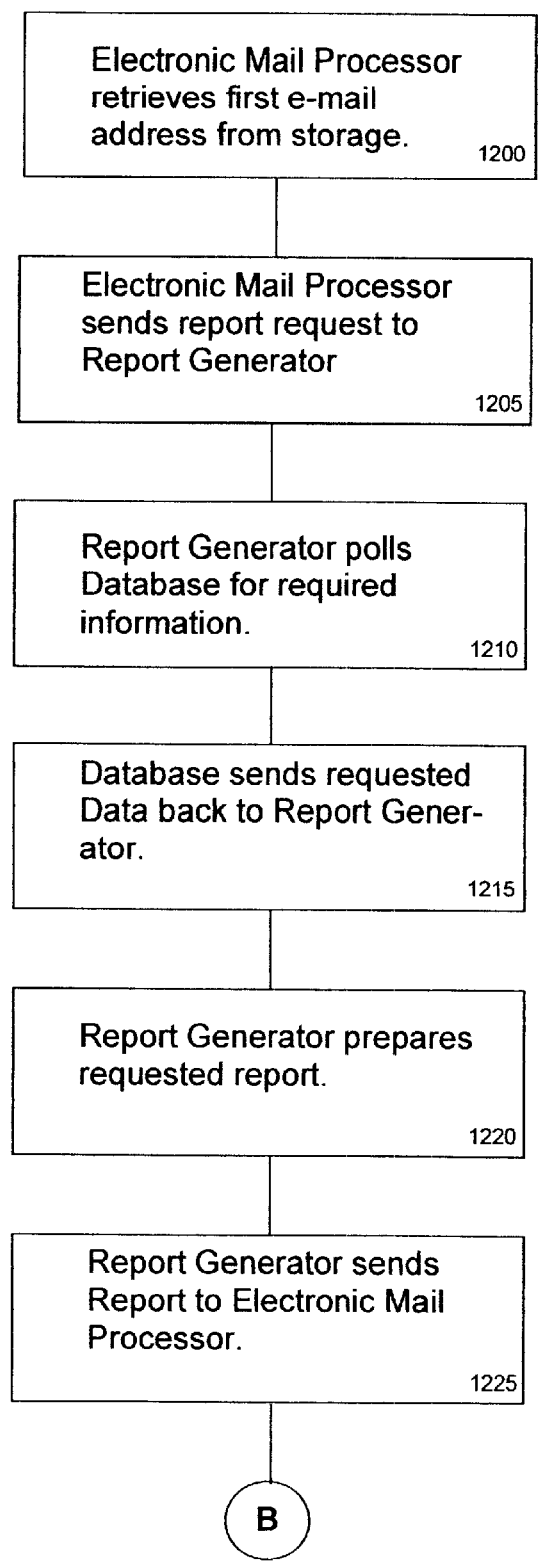
FIGS. 12A and 12B show a flow chart representation of a portion of the method of the present invention.
Figure 12B:
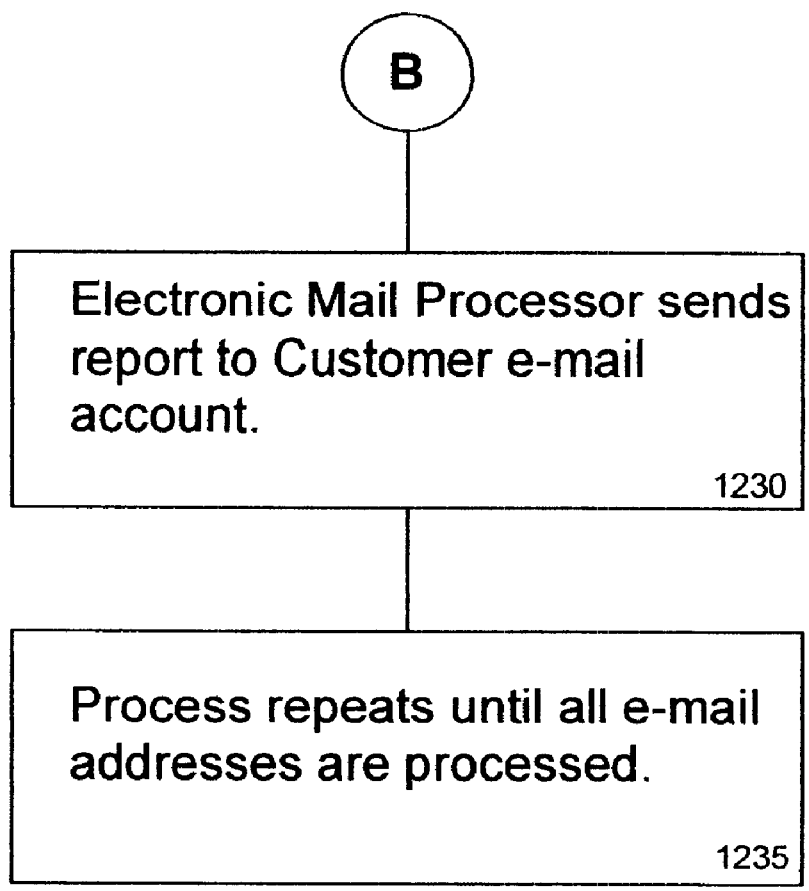

FIGS. 12A and 12B illustrate an exemplary process by which the Electronic Mail Processor 500 sends a simplified e-mail report to one or more e-mail accounts per Customer 600. In step 1200, the Electronic Mail Processor 500 retrieves the first customer e-mail address from storage, notes the customer account information, and in step 1205 sends a report request for that customer to the Report Generator 400. In step 1210 the Report Generator 400 polls the Database 300 for the required data. The Database 300 sends the report data needed to the Report Generator 400 in step 1215, and the Report Generator 400 prepares the requested e-mail report in step 1220. In step 1225 the Report Generator 400 sends the report to the Electronic Mail Processor 500, and in turn the Electronic Mail Processor 500 sends the report to the Customer 600 specified e-mail account, step 1230. The process repeats sequentially until there has been a report processed and sent to each Customer 600 e-mail account, step 1235.

While the invention has been described in detail and with reference to specific examples thereof, it will be apparent to one skilled in the art that various changes and modifications can be made therein without departing from the spirit and scope thereof.

What is claimed is:

1. A method for processing performing data in a data reporting system having a plurality of business entities and a report center in communication with the plurality of business entities, comprising the steps of:

(a) transmitting by each business entity of the plurality of business entities to the report center customer performance data indicative of its own operation during the first day;

(b) processing the customer performance data by the report center to provide processed performance data in accordance with the customer performance data of each of the business entities of the plurality of business entities; and (c) providing availability of the process performance data to a selected business entity during a second day wherein the time difference between the first day and the second day is less than eleven days.

2. The method for processing performance data of claim 1, wherein the availability of the processed performance data is provided by way of electronic mail.

3. The method for processing performance data of claim 1, wherein the selected business entity receiving availability of the processed performance data is one of the plurality of business entities.

4. The method for processing performance data of claim 1, comprising the step of transmitting by way of a network data connection.

5. The method for processing performance data of claim 4, wherein the network data connection comprises an internet connection.

6. The method for processing performance data of claim 1, comprising the further step of requesting the processed performance data by the selected business entity prior to performing step (c).

7. The method for processing performance data of claim 6, wherein the data reporting system includes a user interface and a report generator coupled to the user interface, comprising the further step of receiving the request for the processed performance data by way of the user interface and applying request information to the report generator by the user interface.

8. The method for processing performance data of claim 7, comprising the further step of applying the request information to the report generator in accordance with a security system in order to provide selective access to the data reporting system.

9. The method for processing performance data of claim 8, wherein the security system comprises a cryptographic system.

10. The method for processing performance data of claim 7, wherein the data reporting system includes a data storage database coupled to the report generator comprising the step of storing performance data corresponding to the business entities of the plurality of business entities in a data storage database.

11. The method for processing performance data of claim 10, wherein the data storage database further comprises a statistical database for storing data corresponding to the business entities of the plurality of business entities.

12. The method for processing performance data of claim 1, wherein the processed performance data comprises processed occupancy data.

13. The method for processing performance data of claim 12, wherein the processed performance data comprises processed average daily rate data.

14. The method for processing performance data of claim 13, wherein the processed performance data comprises processed RevPAR data.

15. The method for processing performance data of claim 14, comprising the further step of determining price information in accordance with the processed performance data.

16. The method for processing performance data of claim 15, wherein the customer performance data transmitted to the report center comprises rental car operations information for determining price information.

17. The method for processing performance data of claim 15, wherein the customer performance data transmitted to the report center comprises airline seating information for determining price information.

18. The method for processing performance data of claim 15, wherein the time difference between the first day and the second day is less than six days.

19. The method for processing performance data of claim 15, wherein the time difference between the first day and the second day is less than three days.

20. The method for processing performance data of claim 15, wherein the time difference between the first day and the second day is less than two days.

21. The method for processing performance data of claim 15, wherein the time difference between the first day and the second day is less than one day.

22. The method for processing performance data of claim 15, wherein the customer performance data transmitted to the report center comprises average daily rate information or determining price information.

23. The method for processing performance data of claim 22, wherein the customer performance data transmitted to the report center comprises occupancy data.

24. The method for processing performance data of claim 15, comprising the further steps of:

(a) pricing a product by the selected business entity in accordance with the determined price information; and;

(b) selling the product according to the pricing.

25. The method for processing performance data of claim 24, wherein the product is a hotel room.

26. The method for processing performance data of claim 24, wherein the report center determines that the performance data transmitted by a business entity is incomplete and requests further performance data from the business entity.

* * * * *